United States Patent
Etemad et al.

(10) Patent No.: US 7,693,517 B2
(45) Date of Patent: Apr. 6, 2010

(54) SYSTEM AND METHOD FOR HANDOFF BETWEEN BASE STATIONS

(75) Inventors: Kamran Etemad, Potomac, MD (US); Masoud Olfat, Clarksville, MD (US)

(73) Assignee: Nextel Communications Inc., Reston, VA (US)

( * ) Notice: Subject to any disclaimer, the term of this patent is extended or adjusted under 35 U.S.C. 154(b) by 1183 days.

(21) Appl. No.: 11/199,178

(22) Filed: Aug. 9, 2005

(65) Prior Publication Data

US 2006/0035639 A1 Feb. 16, 2006
US 2008/0051086 A2 Feb. 28, 2008

Related U.S. Application Data

(60) Provisional application No. 60/599,916, filed on Aug. 10, 2004.

(51) Int. Cl.
*H04W 36/00* (2006.01)
(52) U.S. Cl. .................. 455/436; 455/437; 455/438; 455/440
(58) Field of Classification Search .............. 455/436, 455/437, 438, 440; 370/331, 332
See application file for complete search history.

(56) References Cited

U.S. PATENT DOCUMENTS

| 5,956,641 | A * | 9/1999 | Bruckert et al. ............ 455/442 |
| 6,134,443 | A * | 10/2000 | Spann et al. ................ 455/450 |
| 6,216,004 | B1 * | 4/2001 | Tiedemann et al. ......... 455/442 |
| 6,275,478 | B1 | 8/2001 | Tiedemann, Jr. |
| 6,542,744 | B1 | 4/2003 | Lin |
| 6,553,227 | B1 * | 4/2003 | Ho et al. ..................... 455/433 |
| 6,567,666 | B2 | 5/2003 | Czaja et al. |
| 6,590,879 | B1 * | 7/2003 | Huang et al. ................ 370/331 |
| 2002/0021681 | A1 | 2/2002 | Madour |
| 2002/0034947 | A1 * | 3/2002 | Soliman ..................... 455/436 |
| 2002/0048266 | A1 | 4/2002 | Choi et al. |
| 2003/0193952 | A1 * | 10/2003 | O'Neill ..................... 370/392 |
| 2003/0204599 | A1 | 10/2003 | Trossen et al. |
| 2003/0222819 | A1 | 12/2003 | Karr et al. |
| 2004/0082330 | A1 | 4/2004 | Marin |
| 2004/0127163 | A1 | 7/2004 | Schramm et al. |
| 2004/0185852 | A1 * | 9/2004 | Son et al. ..................... 455/438 |
| 2005/0070285 | A1 * | 3/2005 | Goransson .................. 455/436 |
| 2005/0192010 | A1 * | 9/2005 | Kirla .......................... 455/438 |
| 2005/0286470 | A1 * | 12/2005 | Asthana et al. ............. 370/331 |
| 2006/0099952 | A1 * | 5/2006 | Prehofer .................... 455/440 |

FOREIGN PATENT DOCUMENTS

EP 0 948 231 A2 10/1999

OTHER PUBLICATIONS

International Search Report for PCT/US05/28263 dated Feb. 8, 2006.
Written Opinion of the International Searching Authority dated Feb. 8, 2006.

\* cited by examiner

*Primary Examiner*—Joseph H Feild
*Assistant Examiner*—Huy D Nguyen

(57) ABSTRACT

A system and method for handoff are provided. A mobile station performs a make-before-break handoff of a control channel between a serving and target base station and a break-before-make handoff of a traffic channel between the serving and target base stations. The traffic channel handoff is performed after the control channel handoff has completed.

20 Claims, 2 Drawing Sheets

SYSTEM AND METHOD FOR HANDOFF BETWEEN BASE STATIONS

The present application claims priority under 35 U.S.C. § 119 to U.S. Provisional Application No. 60/599,916, filed on Aug. 10, 2004, the entire disclosure of which is herein expressly incorporated by reference.

BACKGROUND OF THE INVENTION

In wireless communication systems, mobility between different geographical areas is provided by allowing mobile stations to handoff their communications between base stations. The base station from which a mobile station is handing off from is typically referred to as a serving base station, and the base station to which the mobile station is to hand off to is typically referred to as a target base station. Mobile stations can include cellular telephones, personal digital assistants (PDAs), computers equipped with wireless transceivers (such as integrated transceivers or transceivers on PCMCIA cards), pagers, and the like.

There are two general types of handoff, hard handoff and soft handoff. Hard handoff is performed in a break-before-make manner, in which a mobile station ceases all traffic and control channel communications with the serving base station and then attempts to establish traffic and control channel communications with the target base station. This approach is used mostly to preserve air-link and network resources utilized by mobile stations in the handoff areas, and might be the preferred mode for high-speed packet data channels. It also simplifies the handling of data packets at the network infrastructure. However, hard handoff does not provide full diversity gain associated with soft handoff, thereby increasing the possibility of temporary session interruption. Such a temporary interruption would impact Quality of Service (QoS) for real-time applications, such as voice.

Using a soft handoff technique, a mobile station will simultaneously communicate with the serving and target base stations over both base stations traffic and control channels. This type of handoff provides diversity, as the mobile station can receive the same information from both base stations. Due to low chance of session interruption, soft handoff is typically preferred where real-time applications such as voice are involved. However, soft handoff requires synchronous resource allocation and scheduling, and coordinated packet handling on the network side. This has a direct impact on throughput efficiency and network complexity. Soft handoff also increases the required backhaul capacity, especially for high rate traffic channels. Additionally, it is only feasible when frequency reuse is 1:1 and strict traffic synchronization is required among all bases stations involved in the soft handoff. Moreover, soft handoff complicates packet scheduling and automatic retransmission request (ARQ) messages.

While many wireless communication technologies provide either soft or hard handoff, broadband communication technologies including cdma2000, 1xEV-DO, WCDMA, Flarion's Flash OFDM® and IEEE80216e provide both hard and soft handoff. Specifically, soft handoff is typically employed for communications that are sensitive to interruptions or errors, while hard handoff is employed for all other communications.

SUMMARY OF THE INVENTION

Exemplary embodiments of the present invention provide a hybrid handoff scheme in which control channel communications are handed off from a serving base station to a target base station, while the mobile station continues to perform data communications with the serving base station. Once the handoff of the control channel communications are completed, the data communications are handed off from the serving base station to the target base station.

In accordance with one embodiment of the present invention, the serving base station informs the mobile station of time periods, corresponding to frames, during which the mobile station can perform the signaling with the target base station necessary for handing off the control channel communications from the serving base station to the target base station. The serving base station then adjusts its scheduler in such a way that the serving base station transmits unicast and multicast messages to the mobile station during time periods other than those during which the mobile station is performing signaling with the target base station.

In accordance with another embodiment of the present invention, a fast cell switch feedback channel is allocated to the mobile station when there is a possibility or a need for a handoff. The mobile station uses the fast cell switch feedback channel to perform the signaling necessary for handing off the control channel communications from the serving base station to the target base station. The mobile station then can handoff the traffic channel communications from the serving base station to the target base station.

Other objects, advantages and novel features of the present invention will become apparent from the following detailed description of the invention when considered in conjunction with the accompanying drawings.

DETAILED DESCRIPTION OF THE PREFERRED EMBODIMENTS

Figure 1:
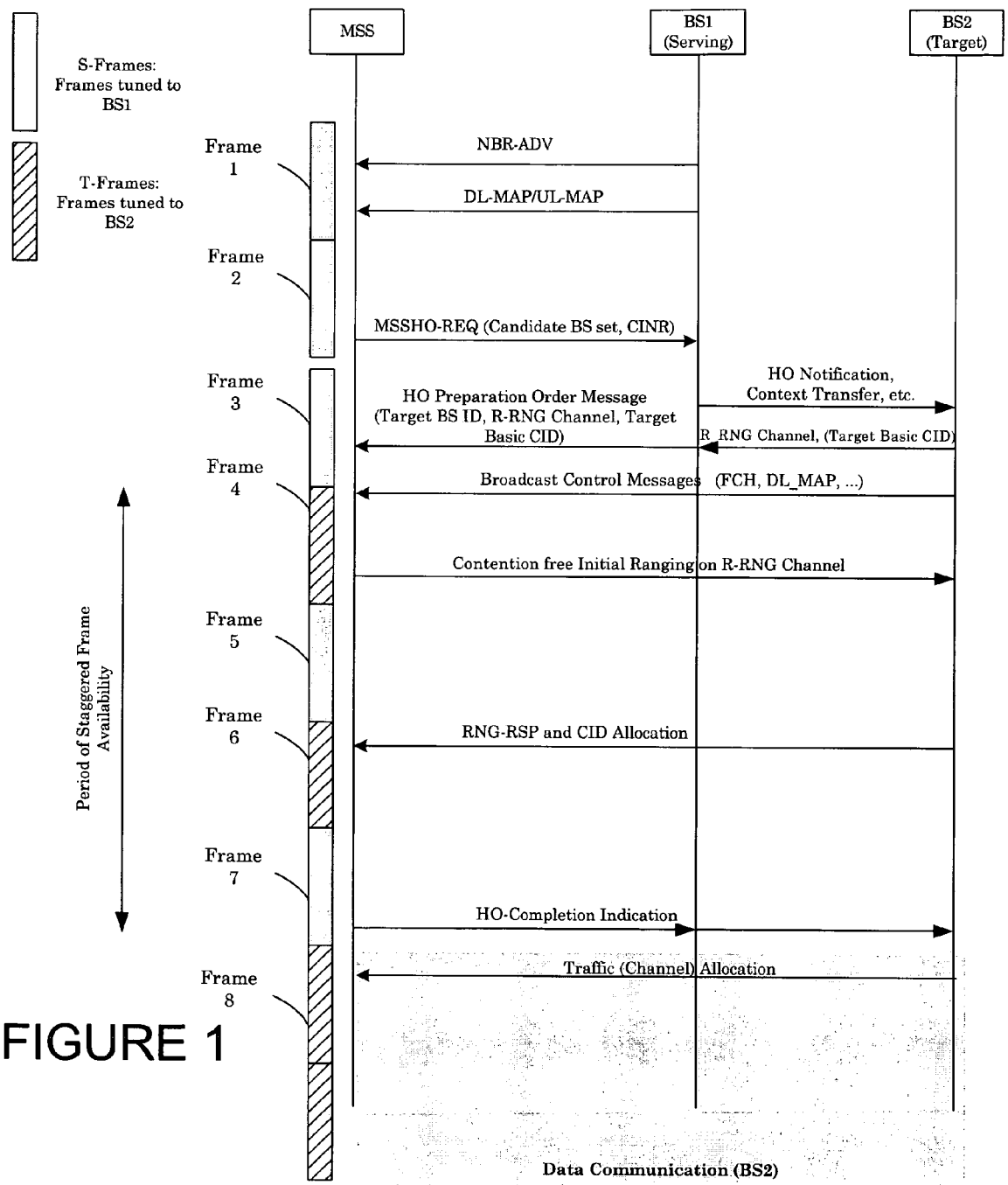
FIG. 1 is a signaling diagram illustrating an exemplary method for handoff of a mobile station between a serving base station and a target base station in accordance with one embodiment of the present invention.

FIG. 1 is a signaling diagram illustrating an exemplary method for handoff of a mobile station between a serving base station and a target base station in accordance with one embodiment of the present invention. During the time period of Frame 1, the mobile station receives a neighbor advertisement (NBR-ADV) message broadcast by the serving base station (BS1) identifying base stations for which the mobile station is to measure their signals. The mobile station can also receive the downlink MAP (DL_MAP) and uplink MAP (UP_ MAP) during Frame 1. The mobile station then measures the received carrier-to-interference plus noise ratio (CINR) of all neighboring base stations advertised in the NBR-ADV message and transmits a mobile station handoff request (MSSHO-REQ) message during the time period of Frame 2. The MSSHO-REQ message identifies the measured base stations and their corresponding CINRs.

Base stations with CINR's above a predetermined threshold are considered as "candidate" base stations for handoff. Based on the received measurements, and other logical considerations, the serving base station, or the handoff controller entity in the network, selects one of the bases stations among the top candidate neighbor base stations as the target base station for handoff. The serving base station, which also serves as an "anchor" base station during the cell switching process, notifies the target base station (BS2) that the mobile station will attempt a handoff and transfer the mobile stations context to the target base station using, for example, HO Notification and Context Transfer messages.

The target base station reserves a ranging channel and basic connection identifier (CID) for the mobile station, and forwards this information to the serving base station. The serving base station, during the time period of Frame 3, transmits a message to the mobile station instructing it to attempt a handoff to the target base station. The message includes the target base station's identification, the reserved ranging channel and the basic CID. The reserved ranging channel can be a physical channel or a logical channel defined by a code. This message can be a HO Preparation Order Message, or can be an extension to a base station handoff response (BSHO-RSP) message. The message also identifies upcoming time periods, or frames, in which the mobile station is allowed to be unreachable, herein referred to as "T-Frames". The serving base station's scheduler is adjusted to prevent scheduling any unicast or multicast messages for transmission to the mobile station during the T-Frames. In FIG. 1 time periods, or frames, in which the mobile station is to communicate with the serving base station are herein referred to as "S-Frames". Although FIG. 1 illustrates the T-Frames occurring following every other S-Frame, other schedules of the T-Frames are possible.

Upon the occurrence of the first T-Frame, i.e., the time period of Frame 4, the mobile station tunes to the control channel of the target base station to receive broadcast control messages, such as the frame control header (FCH), DL_MAP and UL_MAP, and the like. The mobile station then sends an initial ranging message on the reserved ranging channel to the target base station. Although not illustrated, during the T-Frames, the mobile station monitors broadcast information from the target base station, such as the DL_MAP, UL_MAP, downlink channel descriptor (DCD), uplink channel descriptor (UCD), or any other signaling information necessary for handoff. Additionally, the serving base station, as part of the HO-Preparation message, can identify the current DCD and UCD of the target base station, if they are different from that of the serving base station. Otherwise, the mobile station will have to monitor the target base station's downlink message until it receives the DCD and UCD. Knowing the DCD and UCD is necessary, as the mobile station cannot start the initial ranging until it knows the DCD and UCD of the target base station.

The mobile station then tunes again to the serving base station during the next S-Frame, i.e., during the time period of Frame 5, in order to receive any data from the serving base station. During the next T-Frame, i.e., the time period of Frame 6, the mobile station again tunes to the control channel of the target base station to receive the response to the ranging message (RNG-RSP), as well as a CID allocation. Although not illustrated, the mobile station and target base station can exchange other Layer 2 and Layer 3 messages before the mobile station's traffic channel is switched to the target base station. These messages may be related to security, system parameter updates, or other information needed by the mobile station or the base station to carry the session seamlessly.

At the next S-Frame, i.e., the time period of Frame 7, the mobile station tunes to the serving base station and transmits a message indicating that the mobile station has completed the handoff of the control channel to the target base station (HO-Completion Indication). The serving base station forwards an indication of the completed handoff to the target base station, at which point traffic information is switched from the serving to target base station. The target base station, during the time period of Frame 8, transmits a traffic channel allocation to the mobile station and the target base station becomes the serving base station for all traffic and control channel communications for the mobile station.

When the method of FIG. 1 is performed between base stations that operate over the same frequency or frequencies, some message exchanges between the target base station and the mobile station can occur during the S-Frames. If the mobile station reselects the serving base station before handoff to the target base station is completed, the serving base station can terminate the handoff process by notifying the target base station of the early termination. In this case, the serving base station will remain as the serving base station, traffic channel frame exchanges will not be affected, and the mobile station will ignore the T-Frame allocation.

Figure 2:
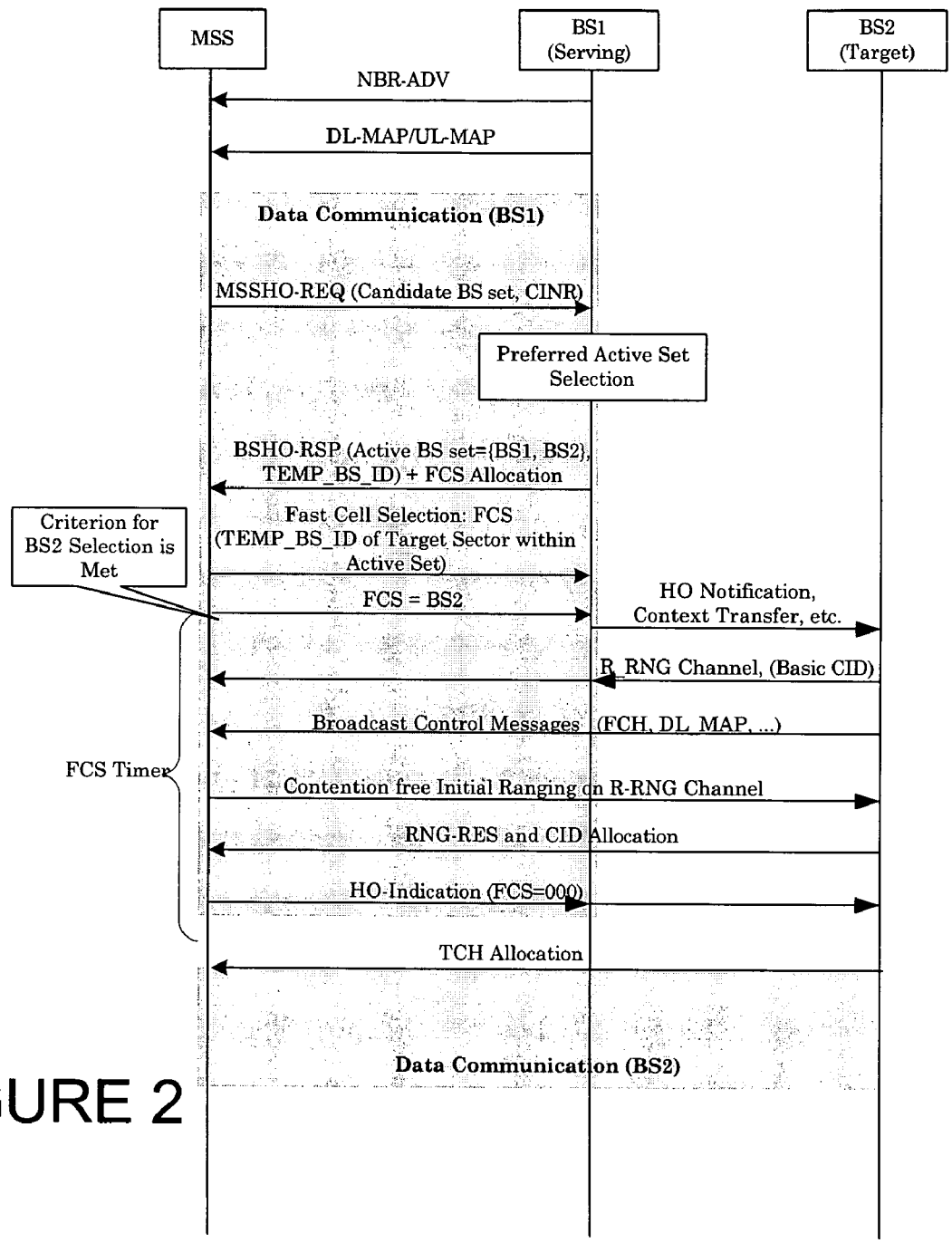
FIG. 2 is a signaling diagram illustrating an exemplary method for handoff of a mobile station between a serving base station and a target base station in accordance with another embodiment of the present invention.

FIG. 2 is a signaling diagram illustrating an exemplary method for handoff of a mobile station between a serving base station and a target base station in accordance with another embodiment of the present invention. In accordance with this embodiment of the present invention, a fast cell switch feedback channel is allocated to the mobile station when there is a possibility or the need for handoff. This channel allows timely and efficient notification of cell switching status, before, during and upon completion of the process.

As illustrated in FIG. 2, the mobile station receives NBR-ADV and DL_MAP and UL_MAP messages from the serving base station. The mobile station then measures the received CINR of all of neighboring base stations advertised in the broadcast NBR-ADV message. The mobile station then transmits a MSSHO-REQ message identifying the measured base stations and their corresponding CINRS.

All reported neighbor base stations with CINR's above a predetermined threshold are considered as "candidate" base stations for handoff. Based on the received measurements, and other logical considerations, the base station specifies a subset of the candidate neighbors as recommended base stations for handoff, namely the Active Set. The serving base station, which also serves as an "anchor" base station during the cell switching process, allocates a dedicated channel named "Fast Cell Switch" or FCS to the mobile station. The Active Set and the FCS channel allocation can be specified through the BSHO-RSP message. The serving base station also allocates a short, e.g. 3 bit, temporary ID for each base station in the Active Set. If the system defines an uplink dedicated control channel for every active user, the FOS may also be defined as a subchannel or field within uplink dedicated control channel.

The FCS channel is used by the mobile station to frequently indicate, e.g. every 5 msec or once a frame, one of the base stations in the Active Set with highest CINR to be the next target base station. The mobile station may consider other factors in selecting the target base station from those in the Active Set.

Right after FCS allocation the mobile station may specify the current anchor base station as the target base station for a period of time until one of the Active Set base station's CINR become stronger than the serving base station. The system also defines a configurable timer for the FCS to allow the network to perform necessary signaling with the target base station, and for the mobile station to establish dual signaling with the serving base station and target base station in a make-before-break manner. The mobile station continues exchanging traffic frames with the serving base station until that timer expires, or when it successfully completes the ranging with the target base station.

If the mobile station reselects the serving base station again, before handoff to the target base station is competed, the serving base station can stop the cell switching process by notifying the target base station of the early termination of handoff. Accordingly, the serving base station does not change and traffic channel frame exchange will not be impacted. During the handoff process the mobile station continues measuring the signals from neighbor base stations and updates the recommended changes to, i.e., additions to and deletions from, the current Active Set through MSSHO-REQ message.

New neighbor base stations will be added to Active Set if their CINR's are above a predetermined threshold, and current Active Set members may be deleted if their CINR's are below another predetermined threshold. The FCS will be automatically released by the mobile station once the serving base station becomes the only member of the Active Set.

When the mobile station notifies the serving base station of its desire to switch to the target base station, the serving base station transmits a message to the target base station informing the target base station of the handoff in process and to transfer the mobile station's context information. The serving base station may also send a message (not illustrated) to the target base station identifying the FCS channel location, so that the target base station can optionally listen to this channel during the cell switching process.

Following the notification, the target base station allocates a basic CID and a reserved initial ranging CID for the mobile station, and transmits this information to the serving base station. The serving base station transmits this information to the mobile station. The mobile station monitors the broadcast information from target base station, such as DL/UL_MAP, downlink channel descriptor (DCD), uplink channel descriptor (UCD), or any other signaling information needed to switch the traffic channel to target base station. To expedite the process of switching, the mobile station can start monitoring some of broadcast messages from target base station as early as the time it sends the FCS=BS2 message to the serving base station. However, some of information which requires a specific CID needs to be read once the early target base station allocation, e.g. basic CID, are forwarded to mobile station from serving base station.

Moreover, the mobile station transmits a message to the target base station on a reserved and contention-free ranging channel allowing the target base station to perform initial ranging. Once the mobile station receives the ranging response along with a CID allocation, it can indicate its handoff completion to the old serving base station by sending a predefined code word on the FCS channel. The mobile station then receives a traffic channel (TCH) allocation from the target base station and the handoff process is completed.

As the base stations in the Active Set are given a temporary ID, e.g. 3 bit TEMP_BS_ID, the mobile station can indicate its selected base station on the FCS channel using this TEMP_BS_ID. One of TEMP_BS_ID's, e.g. 000, or a separate additional bit can be reserved to indicate the handoff completion.

During the context transfer and ranging process with target base station, the traffic communication is still performed between the mobile station and serving base station, as long as the FCS timer is not expired. After the interaction of necessary signaling information, and performing initial ranging, and the allocation of necessary primary and traffic CIDs for mobile station in target base station, the mobile station indicates the handoff completion through the reserved ID on the FCS. The mobile station then releases that channel. This is the moment when the traffic communication is switched from the serving base station to target base station.

Although the present invention has been described in connection with a handoff between two different base stations, the present invention can also be employed for handoffs between two sectors of the same base station. It will be recognized that intra-base station communication and channel establishments with the target sector can be performed faster than the inter-base station processes.

While the present invention is described in the context of an OFDMA system, and in IEEE 802.16 specifically, the present invention is equally applicable to other access technologies and standards.

The methods described above in connection with FIGS. 1 and 2 can be used in, for example, high-speed packet data communications in the control/signaling channels to preserve the link integrity throughout the handoff process, while the hard handoff can be performed for the traffic channels. However, if desired, for real-time and low-rate applications, such as voice, soft handoff can be performed by both traffic and signaling channels.

The methods described above in connection with FIGS. 1 and 2 can be used for both handoff between two base stations with the same frequency, i.e., intra-frequency handoff, and between base stations of different frequencies, i.e., inter-frequency handoff. In both cases the described method allows continuous active communications with the network throughout the handoff process, even for real-time and constant bit rate services, possibly at lower data rates, but with negligible handoff latency.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for handoff of a mobile station from a serving base station to a target base station, the method comprising the acts of:
   receiving data from a serving base station during a first and second time period;
   transmitting control information to the target base station during a time period between the first and second time periods;
   receiving data from the target base station during a time period subsequent to the second time period, wherein the mobile station receives data from only one base station during any particular time period.

2. The method of claim 1, wherein the control information comprises ranging information.

3. The method of claim 2, wherein the first time period corresponds to a first frame, the second time period corresponds to a third frame, the time period between the first and second time periods corresponds to a second frame and the time period subsequent to the second time period corresponds to a fourth frame.

4. The method of claim 1, further comprising the act of:
   providing a base station signal measurement report to the serving base station.

5. The method of claim 4, wherein a signal of the target base station is included in the base station signal measurement report.

6. The method of claim 1, further comprising the act of:
receiving, from the serving base station, a message instructing the mobile station to attempt to handoff to the target base station.

7. The method of claim 6, wherein the message identifies a reserved ranging channel of the target base station and a connection identification to be used for communicating with the target base station.

8. The method of claim 1, wherein the mobile station transmits a handoff complete indication to the serving base station during the second time period.

9. The method of claim 1, wherein the mobile station receives a traffic channel allocation from the target base station during the time period subsequent to the second time period.

10. A method for handoff of a mobile station from a serving base station to a target base station, the method comprising the acts of:
receiving data from a serving base station during a first and second time period;
transmitting control information to the target base station during a time period between the first and second time periods;
receiving data from the target base station during a time period subsequent to the second time period, wherein the mobile station receives data from only one base station during any particular time period;
receiving, from the serving base station, a message instructing the mobile station to attempt to handoff to the target base station, wherein the message identifies a reserved ranging channel of the target base station and a connection identification to be used for communicating with the target base station, wherein the message also identifies the time period between the first and second time periods.

11. The method of claim 10, wherein the control information comprises ranging information.

12. The method of claim 10, further comprising the act of:
providing a base station signal measurement report to the serving base station.

13. The method of claim 12, wherein a signal of the target base station is included in the base station signal measurement report.

14. The method of claim 10, wherein the mobile station transmits a handoff complete indication to the serving base station during the second time period.

15. The method of claim 10, wherein the mobile station receives a traffic channel allocation from the target base station during the time period subsequent to the second time period.

16. A method for handoff of a mobile station from a serving base station to a target base station, the method comprising the acts of:
receiving data from a serving base station during a first frame;
transmitting control information to the target base station during a second frame subsequent to the first frame;
receiving data from the serving base station during a third frame subsequent to the first and second frame;
receiving data from the target base station during a fourth frame subsequent to the third frame, wherein the mobile station receives data from only one base station during any particular frame.

17. The method of claim 16, further comprising the act of:
receiving, from the serving base station, a message instructing the mobile station to attempt to handoff to the target base station.

18. The method of claim 17, wherein the message identifies a reserved ranging channel of the target base station and a connection identification to be used for communicating with the target base station.

19. The method of claim 18, wherein the message also identifies the second frame.

20. The method of claim 19, wherein the mobile station transmits a handoff complete indication to the serving base station during the third frame.

* * * * *